United States Patent [19]

Johnson et al.

[11] Patent Number: 4,693,331

[45] Date of Patent: Sep. 15, 1987

[54] TRACTOR BOOM

[75] Inventors: James A. Johnson, Cologne; Richard Schulz, Lake Crystal, both of Minn.; Vincent J. Tomlonovic, Colfan, Iowa

[73] Assignee: Hiniker Company, Mankato, Minn.

[21] Appl. No.: 855,146

[22] Filed: Apr. 23, 1986

[51] Int. Cl.⁴ .............................................. B62D 13/00
[52] U.S. Cl. ..................................... 180/135; 172/297; 172/734; 180/900; 280/80 B; 280/461 A
[58] Field of Search ............... 180/135, 900, 237, 238, 180/242, 209, 235; 280/80 B, 461 A; 172/297, 298, 306, 307, 292, 734

[56] References Cited

U.S. PATENT DOCUMENTS

| | | | |
|---|---|---|---|
| 2,825,416 | 3/1958 | Schroeder et al. | 180/24 |
| 2,936,039 | 5/1960 | Rockwell | 180/135 |
| 3,256,950 | 6/1966 | DeBiasi | 180/242 |
| 3,270,829 | 9/1966 | Steiger et al. | 180/235 |
| 3,327,413 | 6/1967 | Brinkmeyer et al. | 172/785 |
| 3,329,232 | 7/1967 | Salna | 180/134 |
| 3,527,315 | 9/1970 | Hampton | 180/238 |
| 3,874,479 | 4/1975 | Sjovall | 172/298 |
| 3,982,601 | 9/1976 | Williams | 180/89.12 |
| 4,171,028 | 10/1979 | van der Lely | 180/235 |
| 4,216,975 | 8/1980 | Schafer | 280/461 A |
| 4,363,374 | 12/1982 | Richter et al. | 180/247 |
| 4,453,617 | 6/1984 | Wu | 180/247 |
| 4,611,683 | 9/1986 | Hilmer | 180/900 |

Primary Examiner—John A. Pekar
Attorney, Agent, or Firm—Emrich & Dithmar

[57] ABSTRACT

An elongated boom is pivotally mounted to the forward portion of a tractor and includes a pair of drive/steering wheels mounted to the forward end portion thereof. An electrically actuated, hydraulic control system provides for direction control and rotation of the drive/steering wheels as well as for pivoting displacement of the boom. The drive/steering wheels are mounted to the boom by means of a front axle bolster and pivot assembly, the mounting point of which to the boom may be fixed as desired to permit the effective length of the boom to be varied. Also mounted to a forward portion of the boom by means of the front axle bolster and pivot assembly is a three-point hitch with tilting mast to which a toolbar having a plurality of row units mounted thereto is attached. A hydraulic top link cylinder coupled between the front axle bolster and pivot assembly and the three point hitch allows the toolbar to be rotated about its longitudinal axis and thus affords on-the-go row unit depth control. A pair of hydraulic lift cylinders coupled to the three point hitch via a rock shaft provides for the displacement of the toolbar and row units to an upraised, nonuse position for transport as well as the lowering thereof to a working, ground engaging position.

10 Claims, 4 Drawing Figures

TRACTOR BOOM

BACKGROUND OF THE INVENTION

This invention relates generally to tractors such as used in agriculture and is particularly directed to a tractor having a boom extending forward thereof from which ground working implements may be suspended.

Conventional tractors are generally of the two- or four-wheel drive type wherein either the two or more aft wheels or the forward and aft wheels are subjected to a motive power for the rotation thereof. Attached to an aft portion of the tractor is a hitch assembly generally of the three-point type whereby a toolbar, or toolbars, may be coupled to the tractor and drawn thereby. The one or more toolbars generally include a plurality of ground working implements, or various groups or combinations thereof, positioned in spaced relation along the length of the toolbar. As such, the ground working implements are drawn aft of the tractor and thus to the rear of the tractor operator which gives rise to various operating disadvantages and limitations.

For example, the tandem arrangement of tractor and trailing toolbar is characterized as having a long wheelbase necessitating a large headland turning radius at the end of the crop rows. This large turning radius is not only inconvenient for the tractor operator, but also reduces the usable portion of the field and increases the time required to cultivate the field. In addition, positioning of the implements aft of the tractor operator makes it difficult to view the various implements during operation. Operator observation of the implements as they engage and work the soil is highly desirable in order to ensure they are positioned at the correct depth in the soil, to permit obstructions such as rocks and tree stumps to be voided in preventing damage to the implements, and to ensure that all implements are functioning properly. Finally, the conventional tractor and toolbar arrangement applies only a pulling force to the implements attached to the toolbar placing high torque demands on increasingly larger and more powerful tractor engines. More powerful tractors with larger engines, in turn, results in increased fuel costs to the farmer.

The present invention is intended to overcome the aforementioned limitations of the prior art by providing a tractor boom arrangement wherein an elongated boom is pivotally mounted to a forward portion of a tractor and includes drive/steering wheels on the forward end portion thereof to permit both a pulling and a pushing force to be applied to ground engaging implements mounted to a toolbar positioned intermediate the forward and aft wheels of the tractor. An electrically actuated, hydraulically controlled system provides for directional control as well as rotation of the forward drive/steering wheels as well as pivoting lateral displacement of the boom. This control system also provides for implement depth control as well as toolbar and implement displacement between an upraised, nonuse position and a lowered, use position.

OBJECTS AND SUMMARY OF THE INVENTION

Accordingly, it is an object of the present invention to provide an improved tractor arrangement for agricultural uses.

It is an other object of the present invention to provide for the positioning of agricultural implements forward of the operator of a tractor to which the implements are mounted and by means of which they are drawn.

Yet another object of the present invention is to provide a steering and driving capability for a boom assembly extending forward from a tractor and from which a toolbar is suspended.

A further object of the present invention is to provide for better viewing of and improved control over a plurality of ground working implements drawn by a traction vehicle for the operator thereof.

A still further object of the present invention is to provide improved operator control and handling in a tractor in the form of reduced turning radius, on-the-go adjustment of implement working depth, and stable slope operation.

Still another object of the present invention is to provide an electrically actuated, hydraulic control system for propelling and steering an agricultural traction vehicle as well as for controlling the position and orientation of ground working implements suspended from and drawn by the traction vehicle.

Another object of the present invention is to provide improved visibility of the area being worked by a plurality of ground engaging implements for the operator of a tractor drawing the implements.

Still another object of the present invention is to provide for the mounting of a three-point hitch to the forward portion of an elongated boom pivotally mounted to the front of a tractor.

The present invention contemplates a tractor comprised of an aft drive frame on which is located an engine and a plurality of aft drive wheels and further comprising a boom pivotally coupled to a forward portion of the drive frame and including forward steering/drive wheels positioned on the front end thereof. The combination of a three-point hitch and toolbar with row units positioned along the length thereof is mounted to a front axle bolster and pivot assembly positioned on a forward portion of the boom. Electrically actuated, hydraulic control means are provided for driving the front steering/drive wheels, controlling the steering direction of these wheels, moving the toolbar and row unit combination between an upraised position for transport and a lowered working position, and adjusting the soil working depth of the row units as desired. A pair of hydraulic cylinders are coupled between a forward portion of the drive frame and an aft portion of the boom and provide for pivoting lateral displacement of the boom. The effective length of the boom may be adjusted as desired by changing the mounting location of the front axle bolster and pivot assembly thereon. A second toolbar may be coupled to the first, forward toolbar for drawing a second plurality of row units, such as trailing planter units, aft of the aforementioned first row units mounted on the forward toolbar. Hydraulic means are also provided for raising and lowering the combination of the aft toolbar and row units positioned thereon. This arrangement permits reduced tractor turning radius, affords more stable operation on slopes, and maintains the row units in position in front of and in full view of the tractor operator.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
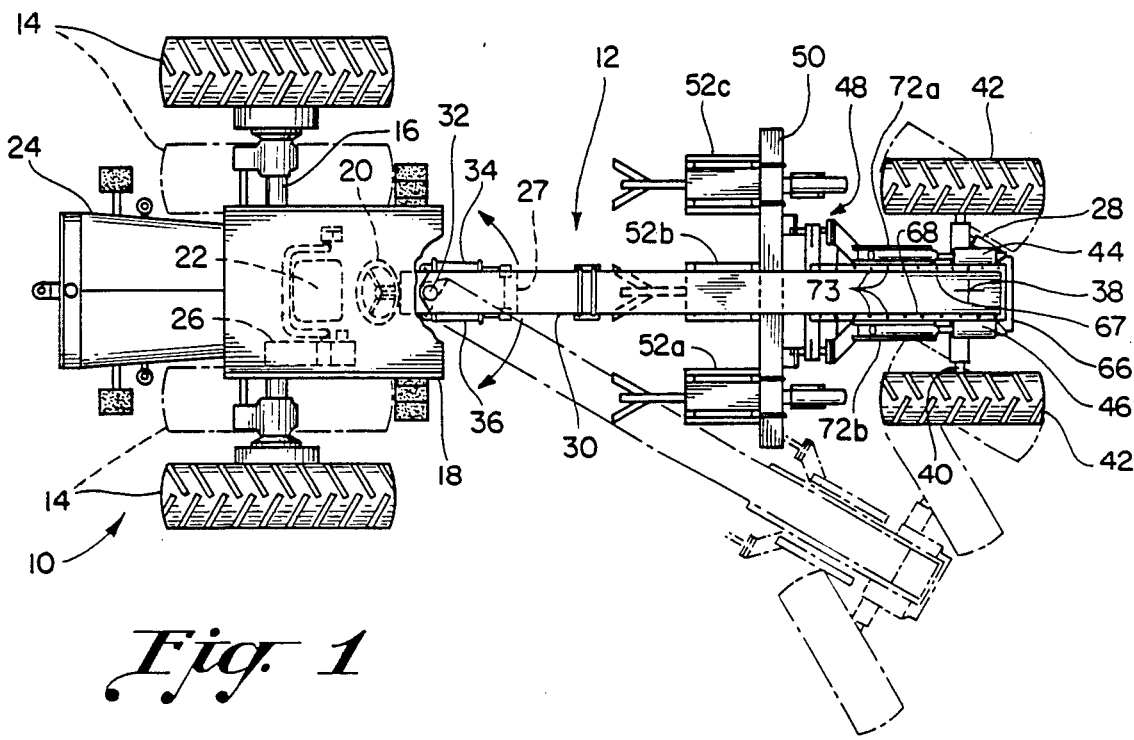
FIG. 1 is a top view of a tractor boom arrangement in accordance with the present arrangement showing the tractor boom and front steering/drive wheels in two different orientations.
Figure 2:
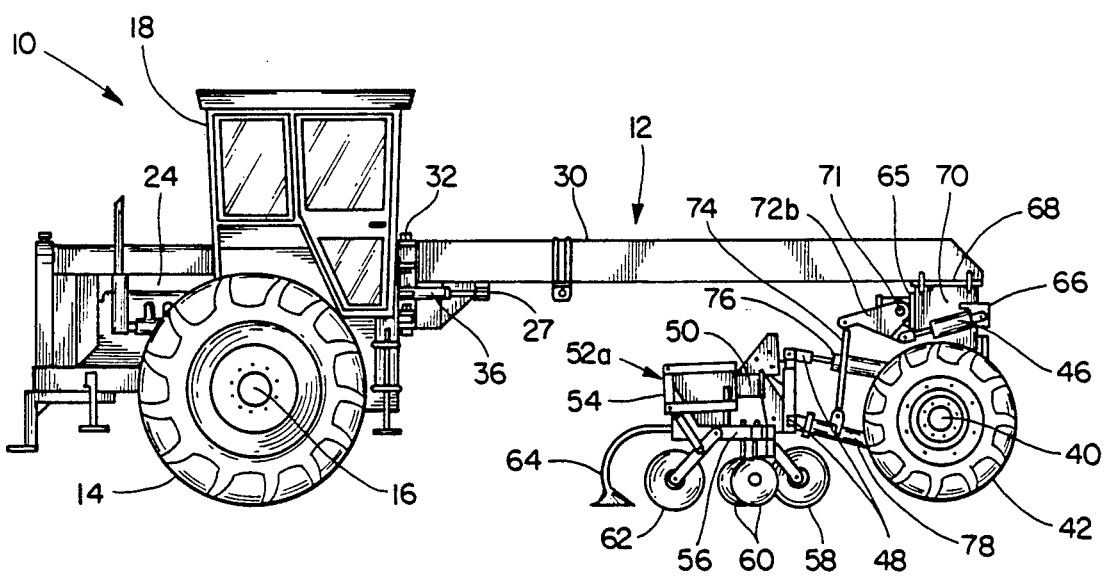
FIG. 2 is a side view of the tractor boom arrangement of the present invention.

Referring to FIGS. 1 and 2, there are respectively shown top and side views of a tractor boom assembly 12 in accordance with the principles of the present invention.

The tractor boom assembly 12 is adapted for coupling to a forward portion of a tractor 10. The tractor 10 includes a plurality of aft drive wheels 14 mounted to a rear drive axle 16. The rear drive axle 16 is coupled to an engine 24 in the tractor 10 by conventional means (not shown). The tractor 10 further includes a cab 18 within which is positioned an operator's seat 22 as well as a steering wheel 20. Also positioned within the cab 18 is a control console 26 on which are located various switches and other control elements for allowing the tractor operator to control the operation of the hydraulic and electrical systems respectively illustrated in FIGS. 3 and 4 and described in detail below. The tractor 10 thus far described is conventional in design and operation and is therefore not described in greater detail herein.

In accordance with the present invention, the tractor boom assembly 12 is coupled to a forward portion of the tractor 10 by means of a swing pivot 32. The tractor boom swing pivot 32 couples an aft end portion of a boom element 30 in the tractor boom assembly 12 to a forward portion of the tractor 10 and allows for the free pivoting displacement of the boom element with respect to the tractor. The tractor boom swing pivot 32 includes a pivot bolt inserted through respective coupling members in a forward portion of the tractor 10 and the aft end portion of the boom element 30 to provide a secure, free pivoting coupling therebetween.

Coupled at respective ends thereof to a forward portion of the tractor 10 and respective aft, lateral portions of the boom element 30 are left and right hydraulic cylinders 34, 36. The designations left and right are taken with the combination of the tractor and tractor boom assembly viewed from the rear thereof. As shown in the figures, the butt ends of each of the articulation hydraulic cylinders 34, 36 are coupled to an A-frame portion of the tractor 10, while the rod end portions of each of these hydraulic cylinders are coupled via a coupling bracket 27 to a respective lateral portion of the boom element 30. The left and right articulation cylinders 34, 36 are hydraulically coupled together and to a hydraulic power system, as described below, such that extension of the left articulation cylinder 34 occurs as the right articulation cylinder 36 is retracted resulting in the rightward pivoting displacement of the boom element 30.

Positioned on a forward end portion of the boom element 30 is a front axle bolster and pivot assembly 70. An upper end portion of the front axle bolster and pivot assembly 70 is coupled to respective left and right lateral portions of the boom element 30 by the combination of left and right guide brackets 67, 68 and a plurality of mounting bolts inserted therethrough. Positioned along a portion of the length of the boom element 30 and on respective lateral portions and toward the forward end thereof are a plurality of apertures 73. Each of the left and right guide brackets 67, 68 is adapted for sliding engagement along a respective latefal portion of the boom element 30 and for secure coupling thereto by means of a plurality of mounting bolts inserted through corresponding apertures 73 in the boom element. As shown in FIGS. 1 and 2, the left and right guide brackets 67, 68 are positioned on the extreme forward end of the boom element 30 and thus the front axle bolster and pivot assembly 70 is mounted on the forward end portion of the boom element. The left and right guide brackets 67, 68 may be slid rearwardly along the respective lateral portions of the boom element 30 by removing the mounting bolts therefrom. With the left and right guide brackets 67, 68 thus moved rearwardly along the boom element 30 and securely coupled thereto by means of the aforementioned mounting bolts, the front axle bolster and pivot assembly 70 may be securely mounted to an intermediate portion of the boom element. By changing the position at which the front axle bolster and pivot assembly 70 is securely mounted to the boom element 30 along the length thereof, the effective length of the boom element may be established as desired. By reducing the effective length of the boom element 30 with the front axle bolster and pivot 70 assembly mounted in a full rearward position thereon, the wheel base and thus the turning radius of the tractor and boom assembly will be minimized.

Securely coupled to a lower portion of the bolster and pivot assembly 70 is a front axle 40. Rotationally positioned on respective ends of the front axle 40 are front drive/steering wheels 42. Direction changes of the front drive/steering wheels 42 and thus steering of the tractor boom assembly is accomplished by means of a hydraulic steering cylinder 28 coupled between the front axle 40 and the bolster and pivot assembly 70, while rotational displacement of each of the front drive/steering wheels is accomplished by means of a respective hydraulic motor (not shown in FIGS. 1 and 2) coupled thereto as described in detail below with respect to FIG. 3.

Positioned on a rear portion of the front axle bolster and pivot assembly 70 and beneath the boom element 30 is an aft mounting bracket 65. Positioned on a forward portion of the front axle bolster and pivot assembly 70 is a front mounting bracket 66. The butt ends of left and right hydraulic lift cylinders 44, 46 are securely coupled to the front mounting bracket 66 by means of a respective coupling pin. The rod ends of the left and right lift cylinders 44, 46 are each coupled to a respective left and right pivot bracket 72a, 72b. Each of the left and right pivot brackets 72a, 72b is, in turn, mounted to a respective end of a rock shaft 71 which is mounted to the front axle bolster and pivot assembly 70 by means of the aft mounting bracket 65. The rock shaft 71 is rotationally displaceable within the aft mounting bracket 65. An aft portion of each of the left and right pivot brackets 72a, 72b is coupled to the upper end portion of a respective lift link 74. The lower end portion of each lift link 74 is coupled to a respective lower lift arm 78. A forward portion of each of the lower lift arms 78 is pivotally coupled to a lower portion of the front axle bolster and pivot assembly 70, while an aft end portion of each of the lower lift arms is pivotally coupled to a lower portion of a three-point hitch assembly 48. A hydraulic top link cylinder 76 is positioned between the two lift links 74 and is coupled at a forward end portion thereof to the front axle bolster and pivot assembly 70 and at an aft end portion thereof to an upper portion of the three-point hitch assembly 48.

Securely coupled in a conventional manner to the three-point hitch assembly 48 is a forward toolbar 50. Positioned in spaced relation along the length of the forward toolbar 50 are a plurality of cultivator row units 52a, 52b and 52c. Each of the cultivator row units includes a flexible upper frame in the general form of a parallelogram 54 and a lower frame 56. Securely mounted to the lower frame 56 are a plurality of ground engaging implements such as a leading gauge wheel 58, a pair of spaced row cleaning or cutting away discs 60, a stabilizing and cutting coulter 62, and a trailing sweep and shank combination 64. Various other ground engaging implements could be mounted to the toolbar 50, as the present invention is not limited to the specific cultivator row unit disclosed or ground engaging implement combination suspended therefrom.

The various aforementioned hydraulic cylinders, the actuation and operation of which is described in detail below, operate in the following manner to control the position of the forward toolbar 50 and ground engaging implements coupled thereto. Extension of the left and right lift cylinders 44, 46 causes a clockwise rotation of the left and right pivot brackets 72a, 72b about the rock shaft 71 as viewed in FIG. 2. With the left and right pivot brackets 72a, 72b pivotally displaced about the rock shaft 71 in a clockwise direction, the aft portions of the pivot brackets are displaced upward resulting in a corresponding upward displacement of the respective lift links 74 coupled thereto. Upward displacement of each of the lift links 74 results in a corresponding lifting of each of the lower lift arms 78 respectively coupled thereto. With a forward portion of each of the lower lift arms 78 pivotally coupled to the front axle bolster and pivot assembly 70 and with each aft end portion thereof coupled to the three-point hitch 48, upward displacement of the two combinations of lift links 74 and lower lift arms 78 will result in a corresponding upward displacement of the three-point hitch 48, the toolbar 50, and all of the cultivator row units mounted thereto. Thus, extension of the left and right hydraulic lift cylinders 44, 46 results in a corresponding upward vertical displacement of the toolbar 50 and ground engaging implements mounted thereto. In this manner, the toolbar/implement combination may be raised to a nonuse, storage position for transport. Similarly, retraction of each of the left and right hydraulic lift cylinders 44, 46 results in a vertically downward displacement of the combination of the toolbar 50 and implements mounted thereto to the working, or ground engaging, position. The left and right lift cylinders 44, 46 thus control the height of the combination of the toolbar and implements mounted thereto with respect to the ground.

A single top link cylinder 76 is positioned between the two lift links 74 and aft of the front axle bolster and pivot assembly 70. The butt end of the top link cylinder 76 is coupled to the front axle bolster and pivot assembly 70, while the rod end thereof is coupled to an upper portion of the three-point hitch 48. Extension and retraction of the top link cylinder 76 results in pivoting displacement of the three-point hitch 48 and the toolbar 50 and implements mounted thereto about a lower portion of the three-point hitch where the hitch is pivotally coupled to the aft ends of the two lower lift arms 78. Thus, extension of the hydraulic top link cylinder 76 results in a counterclockwise rotation of the toolbar 50 and implements mounted thereto as viewed in FIG. 2 about a lower portion of the three-point hitch 48 causing the aforementioned implements to ride at a greater depth in the soil being worked. Similarly, retraction of the top link cylinder 76 results in a clockwise rotation of the toolbar and ground engaging implements about a lower portion of the three-point hitch 48 so as to lift the implements which then operate at a reduced soil depth. It is in this manner that the depth of penetration of the soil being worked may be precisely controlled in the tractor boom assembly 12 of the present invention.

Figure 3:
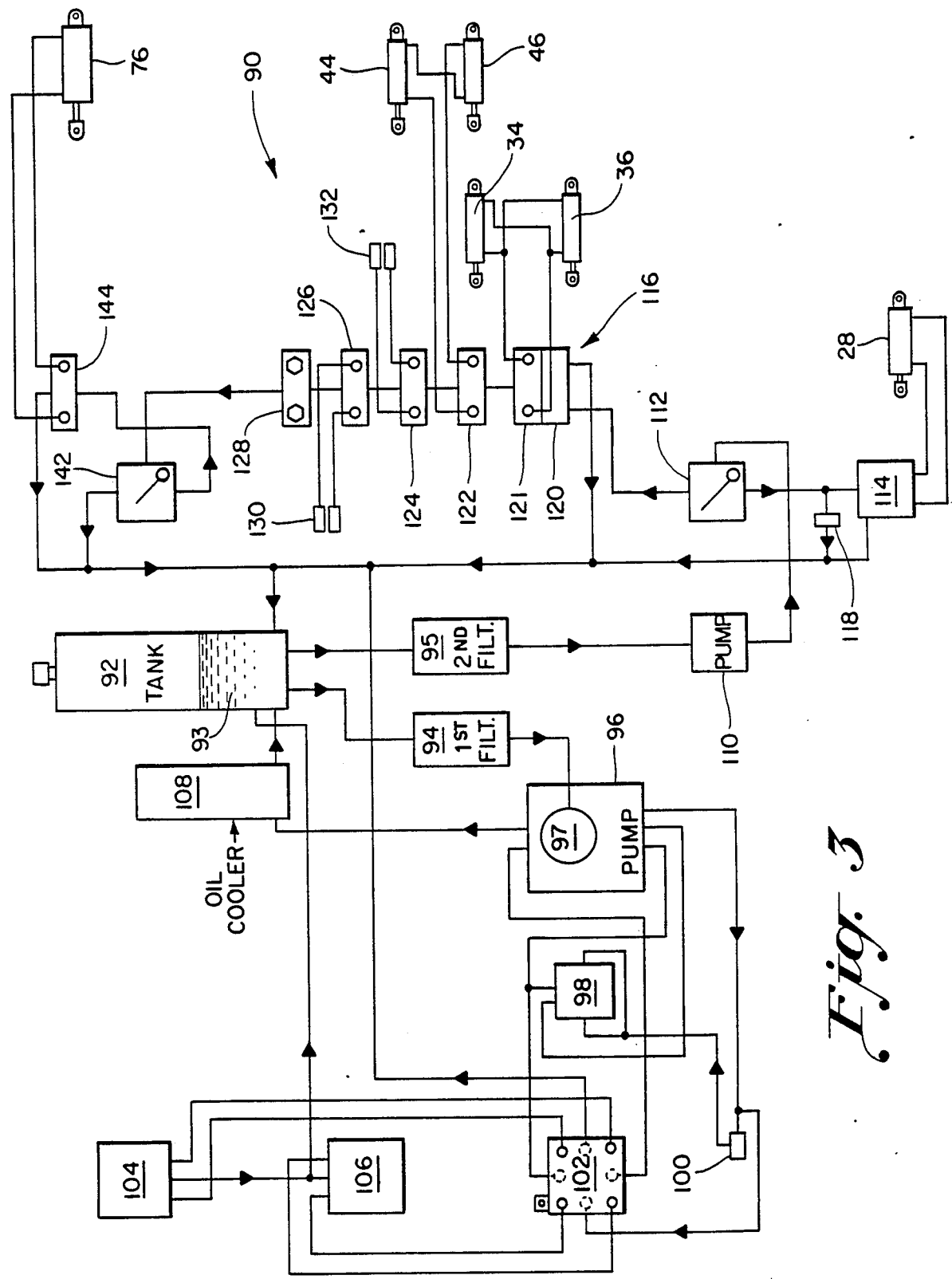
FIG. 3 is a simplified schematic diagram of a hydraulic control system for use in the tractor boom arrangement of the present invention.

Referring to FIG. 3, there is shown a simplified schematic diagram of a hydraulic control system 90 for use in the tractor boom assembly of the present invention. The hydraulic control system 90 includes a tank or reservoir 92 filled with a hydraulic fluid or oil 93 of the type generally used in industrial and agricultural applications. The hydraulic fluid filled tank 92 is coupled via a first filter 94 to a charge pump 97 within a first hydraulic pump 96 and via a second filter 95 to a second hydraulic pump 110. The charge pump 97 maintains the hydrostatic pressure within the hydraulic control system 90 at 180-200 psi and replaces hydraulic fluid losses from leakage in the hydraulic control system. The first hydraulic pump 96 provides hydraulic fluid under pressure from the charge pump 97 to an oil cooler 108 for reducing the temperature of the hydraulic fluid, which is then returned to the tank 92. The first hydraulic pump 96 is further coupled to a bi-directional rear hydraulic motor 98 which, in turn, is coupled by conventional means (not shown) to the rear axle for rotationally displacing the rear drive wheels. Two lines are provided between the first hydraulic pump 96 and the rear hydraulic motor 98, each corresponding to a respective rotational displacement direction of the drive wheels, i.e., either displacing the tractor in a forward or a reverse direction.

The first hydraulic pump 96 is further coupled via a pair of high pressure lines to a front wheel solenoid valve 102. The front wheel solenoid valve 102 includes four combinations of valves and restrictors, with two of these combinations coupled to a left front drive motor 104, and the remaining two combinations coupled to a right front drive motor 106. Each combination valve/restrictor coupled to a respective one of the aforementioned drive motors corresponds to a direction of rotation of one of the front drive/steering wheels shown in FIGS. 1 and 2. As in the case of the rear hydraulic motor 98, both of the left and right front drive hydraulic motors 104, 106 are bi-directional and thus capable of propelling the tractor in either a forward or a reverse direction. An operator controlled inching pedal 100 is coupled to the first hydraulic pump 96, the rear hydraulic motor 98, and the front wheel solenoid valve 102. Actuation of the inching pedal 100, which is located in the tractor cab within easy access of the tractor operator, permits the hydraulic fluid to be rapidly discharged from the system in the case of an emergency such as where it is necessary to immediately stop the tractor. The inching pedal 100 thus functions as an emergency pressure relief valve, and to some extent as a clutch, to allow for de-actuation of the rear hydraulic motor 97 as well as the front drive motors 104, 106 to permit the tractor to be stopped near instantaneously.

The hydraulic tank 92 also provides hydraulic fluid via a second hydraulic filter 95 to a second hydraulic pump 110 which, in turn, is coupled to a first variable flow control valve 112. The first variable flow control valve 112 is coupled to a bank of hydraulic valves 116 and to a hydraulic steering valve 114. Hydraulic fluid under pressure at a value in excess of a given hydraulic pressure is provided to the bank of hydraulic valves 116, while the first variable flow control valve 112 bleeds off hydraulic fluid at this pressure and provides it to the hydraulic steering valve 114. The steering valve 114 is coupled to the aforementioned double-acting hydraulic steering cylinder 28 for controlling the orientation of the front drive/steering wheels as previously described with respect to FIG. 1.

The first variable flow control valve 112 is also coupled to the hydraulic valve bank 116 for controlling the position of the tractor boom assembly and toolbar/implement combination mounted thereto in the following manner. The first variable flow control valve 112 is coupled via a pressure relief valve 120 to an articulate control valve 121 in the hydraulic valve bank 116. The articulate control valve 121 is, in turn, coupled to the left and right hydraulic articulation cylinders 34, 36 for controlling the operation thereof. Thus, when the articulate control valve 121 applies hydraulic fluid under pressure to the butt end of the left hydraulic articulation cylinder 34, the cylinder rod within the left hydraulic articulation cylinder is extended therefrom resulting in the pivoting rightward displacement of the boom element 30 as shown in FIG. 1. The opposite pivoting displacement of the boom element occurs when the articulate control valve 121 applies increased hydraulic pressure to the butt end of the right hydraulic articulation cylinder 36.

The articulate control valve 121 is further coupled to a front lift control valve 122 which, in turn, is coupled to the combination of the left and right hydraulic lift cylinders 44, 46. The left and right hydraulic lift cylinders 44, 46 are mutually coupled such that the right hydraulic cylinder functions as the master cylinder while the left hydraulic lift cylinder functions as a slave cylinder when both are extended in raising the toolbar 50 and row units mounted thereto. Conversely, upon retraction of the left and right hydraulic lift cylinders 44, 46 during the lowering of the combination toolbar and row units mounted thereto, the left hydraulic lift cylinder functions as the master, while the right hydraulic lift cylinder serves as a slave thereto. In addition, during lowering of the toolbar 50, the right hydraulic lift cylinder 46 provides a depth limiting function in restricting the downward displacement of the aforementioned combination.

The front lift control valve 122 is further coupled to a front outlet control valve 124 which, in turn, is coupled to and provides hydraulic fluid under pressure to a pair of front outlets 132 for driving an auxiliary apparatus (not shown) by means of hydraulic pressure. The front outlet control valve 124 is further coupled to a rear outlet control valve 126 which, in turn, provides hydraulic fluid under pressure to a pair of rear outlets 130 for operating yet another auxiliary-type of apparatus (also not shown) by means of hydraulic pressure. The rear outlet control valve 126 is further coupled to a second variable flow control valve 142 via a hydraulic valve bank output control valve 128. The second variable flow control valve 142 is, in turn, coupled to and provides hydraulic fluid under pressure via a top link control valve 144 to the hydraulic top link cylinder 76 to permit on-the-go control of implement soil depth by the tractor operator. The second variable flow control valve 142 reduces the flow of hydraulic fluid within the hydraulic control system 90 to reduce the displacement rate of the toolbar-mounted implements so as to avoid displacement overruns as the operating depth of the implements is adjusted as desired.

From FIG. 3, it can be seen that various return paths to the hydraulic fluid tank 92 are provided from the oil cooler 108, from the first variable control valve 112 via steering valve 114 and relief valve 118, from the relief valve 120, and from the second variable flow control valve 142 and top link control valve 144 to provide an open hydraulic fluid control system.

Figure 4:
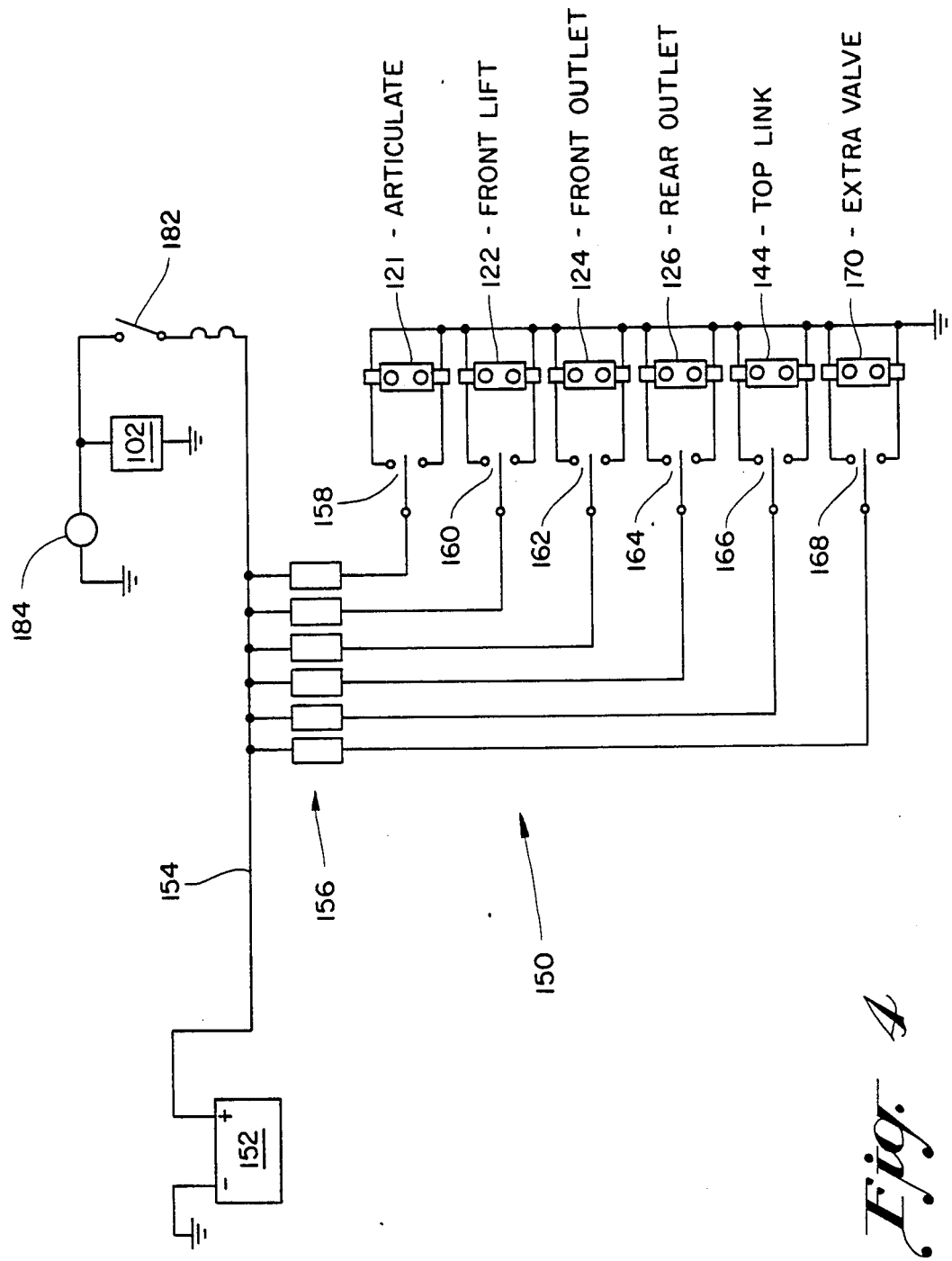
FIG. 4 is a simplified schematic diagram of an electrical actuation system for use with the hydraulic control system of FIG. 3.

Referring to FIG. 4, there is shown in simplified combined schematic and block diagram form an electrical actuation system 150 for use in a tractor having a boom element in accordance with the present invention. The electrical actuation system 150 includes and is energized by a conventional storage battery 152 such as of the lead acid type which is coupled via a plurality of respective fuses 156 to a plurality of single pole, double throw switches. A first switch 158 is coupled to and energizes the articulate control valve 121 for pivoting the boom element either right or left with respect to the tractor. A second switch 160 is coupled to and actuates the front lift control valve 122 for either extending or retracting the left and right hydraulic lift cylinders in either raising the toolbar and implements thereto to a nonuse position or lowering the toolbar and implements to a ground soil engaging, use position. A third switch 162 is coupled to the front outlet control valve 124 to permit a hydraulically driven auxiliary system (not shown) to be operated by the hydraulic control system of FIG. 3. Similarly, a fourth switch 164 is coupled to a rear outlet control valve 126 to allow for control of yet another hydraulic accessory (not shown) coupled thereto. A fifth switch 166 is coupled to the top link control valve 144 to permit the extension and retraction of the top link cylinder 176 in allowing for on-the-go depth control of the various implements mounted to and positioned upon the toolbar. Finally, a sixth switch 168 is coupled to and actuates an extra control valve 170 for controlling still another hydraulic accessory (not shown) coupled thereto. Each of the aforementioned electrical switches is adapted for control by the operator of the tractor and is thus positioned on the control panel 26 as shown in FIG. 1. Finally, the battery 152 is coupled to the front wheel solenoid valve 102 by means of yet another operator responsive manual switch 182 for controlling the direction and speed of the left and right front drive motors as described above with respect to FIG. 3. An indicator light 184 is further coupled to the combination of the manual switch 182 and the front wheel solenoid valve 102 to provide a visual indication of rotational displacement of the front drive/steering wheels by the hydraulic control system.

There has thus been shown a tractor having an elongated boom pivotally mounted to a forward portion thereof. Positioned on a forward end portion of the boom element is a forward frame to which are mounted front steering/drive wheels and to which is coupled the combination of a three-point hitch and an implement bearing toolbar. Various control means are provided for rotationally driving and controlling the direction of the front drive/steering wheels as well as for controlling the operating depth in the soil of the implements positioned on the toolbar as well as for raising the toolbar and implements to a nonuse position for transport/storage. The various aforementioned control means are of the electrically actuated, hydraulic power type. The tractor boom arrangement of the present invention thus provides an arrangement in which the soil engaging implements are simultaneously pulled and pushed and are maintained in position forward of the tractor operator for improved implement viewing and to facilitate control over the implements by the tractor operator.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. An agricultural tractor comprising:
   an aft drive frame having an engine and a plurality of aft drive wheels mounted thereto;
   a forward frame having a plurality of forward drive/steering wheels mounted thereto;
   an elongated boom having an aft end portion pivotally coupled to said aft drive frame and a forward end portion fixedly coupled to said forward frame;
   hitch means coupled to an aft portion of said forward frame and adapted to engage and carry a toolbar having a plurality of soil engaging implements positioned in spaced relation along the length thereof;
   first control means coupled between said forward frame and said hitch means for raising and lowering said toolbar and the implements mounted thereto between a nonuse and a use position, said first first control means including a hydraulic power system and a plurality of hydraulic cylinders under the control of said hydraulic power system;
   a depth control cylinder coupled between said hitch means and said forward frame and further coupled to and actuated by said hydraulic power system for raising and lowering said toolbar and implements positioned thereon in controlling the operating depth of said implements in the soil; and
   first and second hydraulic motors coupled to said hydraulic power system and to a respective forward drive/steering wheel for rotationally displacing said forward drive/steering wheels in imparting movement to the tractor.

2. A tractor as in claim 1 wherein said first control means includes first and second lift cylinders for raising the implements to a nonuse position for transport and lowering the implements to a ground engaging use position.

3. A tractor as in claim 2 further including a rock shaft pivotally mounted to said forward frame and first and second combinations of pivot brackets and lift links coupled to said rock shaft and further connected between said hitch means and said first and second lift cylinders, respectively.

4. A tractor as in claim 1 further comprising first and second rigid lift arms coupling a lower portion of said hitch means to said forward frame and wherein said depth control cylinder couples an upper portion of said hitch means to said forward frame for pivotally displacing said hitch means and toolbar in response to the extension and retraction of said depth control cylinder in respectively increasing and decreasing the operating depth of said implements in the soil.

5. A tractor as in claim 1 further comprising adjustable mounting means for varying the position of said forward frame on said elongated boom along the length thereof in adjusting the effective length of said elongated boom, as desired.

6. A tractor as in claim 5 wherein said adjustable mounting means includes a plurality of apertures in said elongated boom along the length thereof and a mounting bracket on said forward frame adapted for engaging the boom apertures along the length of said elongated boom, as desired.

7. A tractor as in claim 1 further comprising a hydraulic steering cylinder coupled to said forward frame and to said forward drive/steering wheels and actuated by said hydraulic power system for controlling the direction of said forward drive/steering wheels in providing for steering of the tractor.

8. A tractor as in claim 1 further comprising second control means coupled to said elongated boom for pivoting the boom rightward or leftward, as desired.

9. A tractor as in claim 8 wherein said second control means includes first and second hydraulic cylinders coupled to said aft drive frame and to respective lateral portion of said elongated boom and further coupled to said hydraulic power system and actuated thereby for pivotally displacing said elongated boom rightward or leftward relative to said aft drive frame.

10. A tractor as in claim 1 wherein said first control means further includes an electrical actuation system coupled to said hydraulic power system for the actuation thereof.

* * * * *

UNITED STATES PATENT AND TRADEMARK OFFICE
CERTIFICATE OF CORRECTION

PATENT NO. : 4,693,331

DATED : September 15, 1987

INVENTOR(S) : James A. Johnson, Richard Schulz, and Vincent J. Tomlonovic

It is certified that error appears in the above-identified patent and that said Letters Patent is hereby corrected as shown below:

Column 4, line 14, "latefal" should be -- lateral --.

Column 10, line 49, (claim 9), "portion" should be -- portions --.

Signed and Sealed this

Twenty-third Day of February, 1988

Attest:

DONALD J. QUIGG

Attesting Officer

Commissioner of Patents and Trademarks